(12) United States Patent
Bharadwaj et al.

(10) Patent No.: US 7,877,231 B2
(45) Date of Patent: Jan. 25, 2011

(54) ELECTROMECHANICAL ACTUATOR AND EFFECTOR HEALTH MANAGEMENT SYSTEM AND METHOD

(75) Inventors: Raj M. Bharadwaj, Maple Grove, MN (US); Dwayne M. Benson, Chandler, AZ (US); George D. Hadden, Plymouth, MN (US); Darryl G. Busch, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 294 days.

(21) Appl. No.: 12/177,721

(22) Filed: Jul. 22, 2008

(65) Prior Publication Data

US 2010/0023301 A1  Jan. 28, 2010

(51) Int. Cl.
*G06F 17/00* (2006.01)
*G06F 11/07* (2006.01)

(52) U.S. Cl. .......... 702/182; 702/185; 702/150; 702/58; 700/21; 700/26

(58) Field of Classification Search .......... 702/182, 702/35, 38, 58, 115, 150, 185
See application file for complete search history.

(56) References Cited

U.S. PATENT DOCUMENTS

| | | | |
|---|---|---|---|
| 4,646,227 A | 2/1987 | Corbin et al. | |
| 6,615,090 B1 | 9/2003 | Blevins et al. | |
| 6,847,917 B2 * | 1/2005 | Bechhoefer | 702/183 |
| 6,892,127 B2 | 5/2005 | Wiseman | |
| 6,983,207 B2 | 1/2006 | Gotou et al. | |
| 7,009,535 B2 | 3/2006 | Kanekawa et al. | |
| 7,222,048 B2 | 5/2007 | Petchenev et al. | |
| 7,283,933 B2 | 10/2007 | Roach et al. | |
| 7,283,934 B2 | 10/2007 | Deller et al. | |
| 7,292,954 B2 | 11/2007 | Deller et al. | |
| 2003/0127569 A1 | 7/2003 | Bacon et al. | |
| 2004/0199360 A1 | 10/2004 | Friman et al. | |
| 2005/0212523 A1 * | 9/2005 | Chang et al. | 324/511 |
| 2006/0036402 A1 * | 2/2006 | Deller et al. | 702/183 |
| 2006/0043242 A1 | 3/2006 | Benson | |
| 2007/0198225 A1 * | 8/2007 | Roach et al. | 702/189 |
| 2008/0091383 A1 | 4/2008 | Ueno | |

* cited by examiner

*Primary Examiner*—Hal D Wachsman
(74) *Attorney, Agent, or Firm*—Ingrassia Fisher & Lorenz, P.C.

(57) ABSTRACT

A system and method are provided for supplying electromechanical actuator (EMA) health status information to a control system. A determination is made as to whether the EMA has experienced a fault. If the EMA has experienced a fault, a fault-based position limit and a fault-based rate limit of the EMA are determined, based on the fault. A design position limit and a design rate limit of the EMA are supplied. An updated position limit of the EMA is determined based on at least the design position limit and the fault-based position limit, and an updated rate limit of the EMA is supplied based on at least the design rate limit and the fault-based rate limit.

18 Claims, 4 Drawing Sheets

ELECTROMECHANICAL ACTUATOR AND EFFECTOR HEALTH MANAGEMENT SYSTEM AND METHOD

TECHNICAL FIELD

The present invention generally relates to component and system health management, and more particularly relates to a health management system and method for electromechanical actuators (EMAs) and EMA-based effectors and systems.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and missile thrust vector control systems, electromechanical actuators (EMAs) are used. An EMA typically includes an electric motor that, when properly energized, supplies a torque to a suitable actuation device, which in turn positions a control surface or component.

Actuators, such as the above-mentioned EMAs, may be subject to relatively severe environmental conditions, as well as relatively high magnitude shock and vibration. These conditions, as well as others, may have deleterious effects on actuator operability. These deleterious effects, if experienced while a vehicle is operating, could leave little time for corrective actions. Hence, there is a growing desire for a system and method of monitoring the health of actuators. However, in addition to monitoring actuator health status, it would be desirable to determine the potential effect that a potentially degraded actuator may have on overall system operation, and supply information of these potential effects so that a system may, if needed, reconfigure itself to accommodate such a degraded actuator.

Hence, there is a need for a system and method of monitoring actuator health status, determining the potential effects that a potentially degraded actuator may have on overall system operation, and supplying information of potential effects. The present invention addresses at least this need.

BRIEF SUMMARY

In one embodiment, and by way of example only, a method of supplying health status information for an electromechanical actuator (EMA) to a control system includes determining whether the EMA has experienced a fault. If the EMA has experienced a fault, a fault-based position limit and a fault-based rate limit of the EMA are determined, based on the fault. A design position limit and a design rate limit of the EMA are supplied. An updated position limit of the EMA is determined based on at least the design position limit and the fault-based position limit, and an updated rate limit of the EMA is supplied based on at least the design rate limit and the fault-based rate limit.

In another exemplary embodiment, a method of controlling an electromechanical actuator (EMA) includes determining whether the EMA has experienced a fault. If the EMA has experienced a fault, a fault-based position limit and a fault-based rate limit of the EMA are determined, based on the fault. A design position limit and a design rate limit of the EMA are supplied. An updated position limit of the EMA is determined based on at least the design position limit and the fault-based position limit, and an updated rate limit of the EMA is determined based on at least the design rate limit and the fault-based rate limit. The updated position and rate limits of the EMA are supplied to a vehicle controller, and the EMA is controlled based on the updated position and rate limits.

In yet another exemplary embodiment, an electromechanical actuator (EMA) health management system includes memory, a fault determination module, and a fusion module. The memory has stored therein data representative of a design position limit and a rate position limit of the EMA. The fault determination module is in operable communication with the EMA, is configured to determine whether the EMA has experienced a fault and, if the EMA has experienced a fault, to determine a fault-based position limit and a fault-based rate limit of the EMA. The fusion module is in operable communication with the memory and the fault determination module to receive therefrom the design position and rate limits and the fault-based position and rate limits, respectively. The fusion module is configured to determine an updated position limit of the EMA based on at least the design position limit and the fault-based position limit, and an updated rate limit of the EMA based on at least the design rate limit and the fault-based rate limit.

Furthermore, other desirable features and characteristics of the EMA health management system and method will become apparent from the subsequent detailed description and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
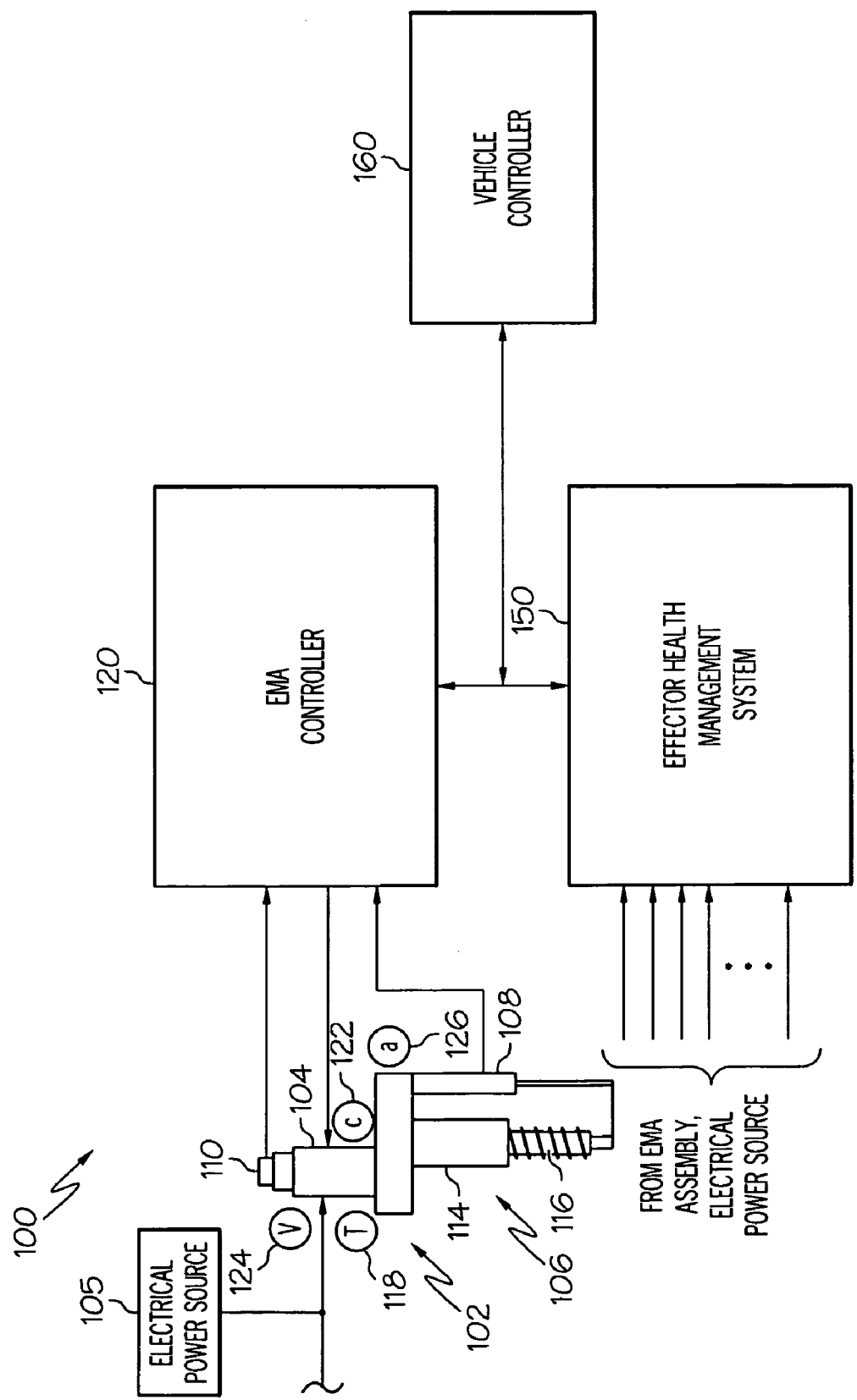
FIG. 1 depicts a functional block diagram of an electromechanical actuator (EMA)-based effector control system according to an exemplary embodiment of the present invention.

Turning first to FIG. 1, an embodiment of an exemplary electromechanical actuator (EMA)-based effector control system 100 is depicted. The system 100, which may be used to control the movement of one or more control effectors. Some non-limiting examples of suitable control effectors include one or more flight control surfaces, one or more thrust reverser system components, one or more valves, or any one of numerous other devices, includes an electromechanical actuator (EMA) assembly 102 and a controller 120. Before proceeding further it is noted that although the system 100 is depicted and described as including only a single EMA 102 and a single controller 120, this is done merely for clarity and ease of depiction and description. In some embodiments the system 100 may be implemented with more than one EMA 102 and, if needed or desired, more than one controller 120.

The EMA assembly 102 includes a power drive unit 104, an actuator 106, and a plurality of position sensors 108, 110. The power drive unit 104 is preferably implemented as a motor 104 and, at least in the depicted embodiment, is coupled to the actuator via a gearbox 112. The motor 104 is preferably implemented an electric motor, and may be any one of numerous types of AC or DC motors including, for example, an AC induction motor or a brushed DC motor. In a preferred embodiment, however, the motor 104 is implemented as a brushless DC motor. No matter how the motor 104 is specifically implemented, it is configured, upon being properly energized and supplied with actuation position control signals, to rotate and supply a drive torque to the actuator 106 via the gearbox 112. It will be appreciated that the actuator assembly 102 may, in some embodiments, be eliminated.

In the depicted embodiment the actuator 106 includes an actuation member 114, which is coupled to receive the drive torque from the motor 104 and gearbox 112, and a translation member 116. In response to the drive torque supplied from the motor 104 and gearbox 112, the actuation member 114 rotates. The translation member 116 is coupled to the actuation member 114 and is configured, upon rotation thereof, to translate to a position. It may be seen that the actuation member 114 and the translation member 116, at least in the depicted embodiment, are implemented as a ballscrew assembly, in which the ballscrew functions as the actuation member 114 and the ballnut functions as the translation member 116. It will be appreciated, however, that this is merely exemplary, and that the actuation member 114 and translation member 116 could be implemented as any one of numerous assemblies that convert rotational motion into translational motion including, for example, jackscrew assemblies and rollerscrew assemblies, just to name a few. It will additionally be appreciated that the EMA assembly 102 could be implemented as any one of numerous other types of EMAs including, but not limited to, numerous types of rotary actuators and/or numerous types of linear actuators, just to name a few.

The position sensors include a first position sensor and a second position sensor 108, 110, respectively. The first position sensor 108 is coupled to, and is configured to supply a position signal representative of the position of, the translation member 116. Thus, when the translation member 116 translates in response to actuation member 114 rotation, the portion of the first position sensor 108 that is coupled to the translation member 116 translates a commensurate distance. In the depicted embodiment the first position sensor 108 is implemented using a linear variable differential transformer (LVDT) type of position sensor, though any one of numerous other types of sensors may also be used. Additional translational and rotational sensors may be coupled to the non-illustrated control effector(s) to sense the position of the effector(s).

The second position sensor 110 is coupled to the motor rotor. Thus, when the motor 104 rotates the second position sensor 110 also rotates and supplies a position signal representative of the rotational position of the motor 104. It will be appreciated that the motor rotational signals are used, in some embodiments, to properly commutate the motor 104. Moreover, the motor rotational signals are also representative of the position of the translational member 116. The second position sensor 110, at least in the depicted embodiment, is implemented using a resolver, though it may also be implemented using any one of numerous other types of suitable sensors. No matter the particular types of position sensors that are used, the position signals from each of the position sensors 108, 110, are preferably supplied to the controller 120.

The controller 120 supplies actuation position control signals to the motor 104 and, as was just mentioned, receives position signals from each of the position sensors 108, 110. The controller 120 is configured to receive external control signals from one or more external sources (not shown in FIG. 1). In response to these control signals, the controller 120 supplies actuation position control signals to the motor 104, which causes the motor 104 to be appropriately energized from an electric power source 115, to thereby rotate in the direction that will cause the translation member 116 to move to a desired position. The controller 120, using the position signals as feedback, properly commutates the motor 104 and implements a closed-loop control law to move the translation member 116 to the desired position.

Before proceeding further it is noted that additional health management and control sensors may be associated with the EMA assembly 102 and/or control effector, if needed or desired. For example, and as FIG. 1 depicts in phantom, the EMA assembly 102 may have associated therewith one or more temperature sensors 118, one or more motor current sensors 122, one or more voltage sensors 124, and one or more bearing accelerometers 126, just to name a few. As will be described in more detail further below, these sensors, if included, may be used to provide enhanced health status information for the EMA assembly 102.

Figure 2:
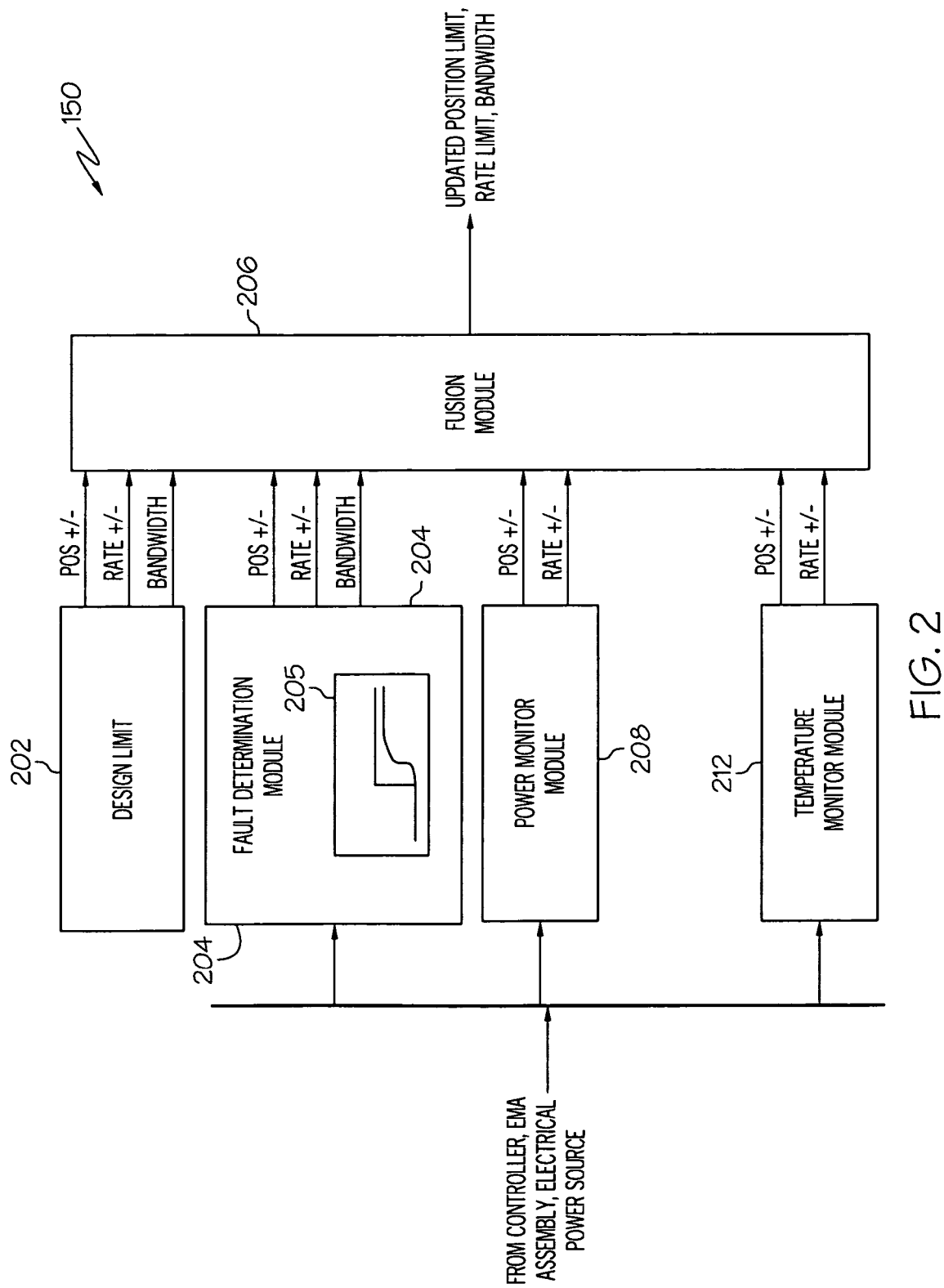
FIG. 2 depicts a functional block diagram of an exemplary effector health management system that may be used to implement the system of FIG. 1.

As FIG. 1 also depicts, the control system 100 is coupled to, or is otherwise in operable communication with, an effector health management system 150, and may additionally be coupled to a vehicle (or system) controller 160. The effector health management system 150, which is also in operable communication with the vehicle controller 160, is configured to determine and supply health status information for the EMA assembly 102 and/or control effector(s) to the EMA controller 120 and/or the vehicle controller 160. As will be described in more detail further below, the control law implemented in the controller 120 may be influenced, either directly or indirectly, by the health status information supplied by the effector health management system 150. A more detailed functional block diagram of the effector health management system 150 is depicted in FIG. 2, and with reference thereto will now be described in more detail.

The effector health management system 150 includes memory 202, a fault determination module 204, and a fusion module 206. The memory 202 stores various numbers and types of data. Including among these stored data are data representative of the design position limit, the design rate limit, and the design bandwidth of the EMA assembly 102. The memory 202 may also, in some embodiments, store a design torque limit of the EMA assembly 102. The design position limit, as is generally known, corresponds to the fully-extended position to which the EMA assembly 102 was designed to be moved. The design rate limit corresponds to the maximum rate at which the EMA assembly 102 was designed to move. Moreover, the design bandwidth, as is generally known, is related to the design frequency response of the EMA assembly 102. It will thus be appreciated that the EMA assembly 102, upon initial installation in the system 100, may be moved, if needed or desired, to a position that corresponds to the design position limit, and may be moved to the design position limit (or any other position, for that matter) at a rate that corresponds to the design rate limit. Moreover, the EMA assembly 102 will exhibit a frequency response that corresponds to the design bandwidth.

The fault determination module 204 is in operable communication with the EMA assembly 102 and is configured to determine whether the EMA assembly 102 has experienced a fault. The fault determination module 204 is additionally configured, if it determines that the EMA assembly 102 has experienced a fault, to determine at least a fault-based position limit and a fault-based rate limit of the EMA assembly 102. As FIG. 2 also depicts, the fault determination module 204 may additionally be configured to determine a fault-based bandwidth. Moreover, while not depicted in FIG. 2, the fault determination module 204 may also be configured to determine a fault-based torque limit.

The fault determination module 204 may be variously configured to implement its functionality. In the depicted embodiment the fault determination module 204 includes, among other functions, a software model 205 of the EMA assembly 102. The fault determination model 204, and more specifically the EMA assembly software model 205, is coupled to receive the same actuation position control signals that are supplied to the EMA assembly 102. The fault determination module 204 is additionally coupled to receive data representative of the response of the EMA assembly 102 to the actuation position control signals. For example, the EMA software model 205 may receive the position signals from the first and second position sensors 108, 110. The EMA software model 250 may also receive sensor signals from one or more of the above-mentioned additional sensors 118-126, if included. The fault determination module 204 compares the response of the EMA assembly 102 and the response of the EMA assembly software model 205 and, based on this comparison, determines if the EMA assembly 102 has experienced a fault. In particular, if the comparison indicates that the EMA assembly 102 is not responding consistent with the EMA assembly software model 205, this indicates that the EMA assembly 102 has likely experienced some type of a fault.

It will be appreciated that the particular types of faults that the EMA assembly 102 may potentially experience may vary. For example, it is postulated that the EMA assembly 102 could experience a broken linkage, a stuck actuator, bad EMA subassemblies such as one or more failed bearings, a failed ballscrew, a failed gearbox, and a failed motor, just to name a few. As will be described further below, in some embodiments the fault determination module 204, upon determining that the EMA assembly 102 has experienced a fault, causes an appropriate test signal to be transmitted to the EMA assembly 102 in order to confirm the presence of the fault. This confirmation also improves the accuracy of the fault-based position, rate, and/or bandwidth limits. It will be appreciated that the test signal that is transmitted to the EMA assembly 102 may be generated and supplied directly from the fault determination module 204, or the fault determination module 204 may request a separate device, such as the fusion module 206, the controller 120, or the vehicle controller 160, to supply the appropriate test signal.

In addition to the variation in the particular types of faults that may be experienced, the manner in which the particular faults are determined may also vary. For example, the faults may be determined via various built-in test (BIT) procedures, which may supply BIT data to the system 150. Moreover, the system 150 may determine various faults from the various sensor data and command data supplied thereto. For example, in some embodiments a stuck actuator assembly fault may be determined if the measured effector position does not change in response to a command and/or if the value of the measured electrical load, in response to a command, is substantially greater than the estimated load for the same command. A position-limited actuator assembly fault may be determined if the measured effector/actuator position prematurely plateaus before reaching the commanded position and/or if the value of the measured electrical load, in response to a command, is substantially greater than the estimated load for the same command. A rate-limited actuator assembly fault may be determined if a calculated value of effector/actuator assembly movement rate is less than a threshold movement rate value. A torque-limited actuator assembly fault may be determined if the value of the measured electrical current, in response to a command, is substantially greater than the estimated current for the same command. It will be appreciated that these fault determination methods are merely exemplary, and are in no way meant to be inclusive of the exhaustive methods for determining the existence of various faults.

Figure 3:
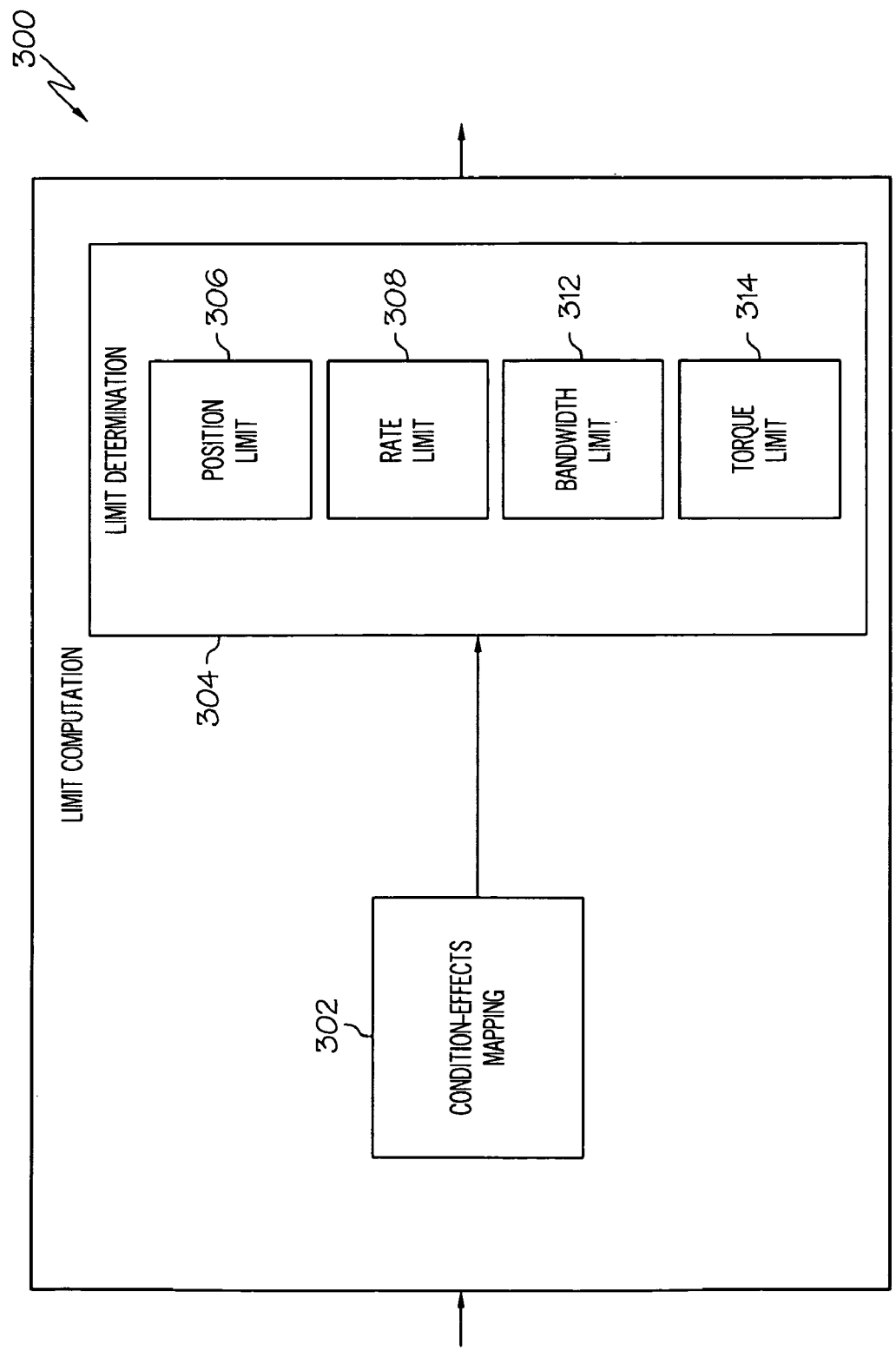
FIG. 3 depicts a block diagram of a limit computation function implemented in the effector health management system of FIG. 2.

Turning now to FIG. 3, it is seen that the fault determination module 204, within or in addition to the software model 205, implements a limit computation function 300. The limit computation function 300 itself implements a condition-effects mapping function 302 and a limit determination function 304. The condition-effects mapping function 302 receives various types of data and, based on these data, determines which of the above-describe limits (e.g., position, rate, bandwidth, torque) need to be evaluated/reevaluated. The types of data it receives may vary, but in the depicted embodiment the data include sensor data from the each of the sensors 108, 110, 118-126, as well as various other non-illustrated health management and control sensors, various built-in test (BIT) data, and data from the above-mentioned software model 205, just to name a few. Based on the data it receives, the condition-effects mapping function 302 determines if one or more faults are present and, using predetermined mapping, determine which limits need to be evaluated/reevaluated, and informs the limit determination function 304.

The limit determination function 304, in response to communications from the condition-effects mapping function 302, determines the appropriate limits. As such, the limit determination function implements a position limit determination function 306, a rate limit determination function 308, a bandwidth limit determination function 312, and (at least in some embodiments) a torque limit determination function 314. The manner in which each limit determination function 306-314 determines the associated limits may vary, from the relatively complex to the less complex. For example, if the EMA assembly 102 is supplied with a command that is less than one of the present limits, and the EMA assembly 102 or effector response to this command is less than the command, then the new limit will be set to the response. As a more illustrative example of this methodology, assume the present position limit is set to "10" and the EMA assembly 102 is commanded to position the effector to "5." If the EMA assembly 102 can only position the effector to "3" then position limit determination function 306 would determine that the new position limit is "3."

Returning once again to FIG. 2, the fusion module 206 is in operable communication with the memory 202 and the fault determination module 204. The fusion module 204 may thus receive the design position, rate, and bandwidth limits from the memory 202, and the fault-based position, rate, and bandwidth limits from the fault determination module 204. The fusion module 206, upon receipt of the design limits and the fault-based limits, determines, as appropriate, updated position, rate, and bandwidth limits of the EMA assembly 102. The updated position, rate, and bandwidth limits are supplied to the controller 120 so that the control law (or laws) implemented in the controller 120 may be updated as needed to compensate for the updated limits, and so that the EMA assembly 102 may be controlled based on the updated limits.

As FIG. 2 depicts, the effector health management system 150 may additionally include a power monitor module 208 and a temperature monitor module 212. The power monitor module 208 is in operable communication with the EMA assembly 102, and is configured to determine whether the EMA assembly 102 has experienced electric power degradation. The power monitor module 208 is also configured, if the EMA assembly 102 has experienced electric power degradation, to determine what are referred to herein as a degradation-based position limit and a degradation-based rate limit of the EMA assembly 102.

The power monitor module 208 may be variously configured to implement the above-described function. In the depicted embodiment, however, the power monitor module 208 is coupled to receive a signal representative of an electrical characteristic of the electrical power source 115. The power monitor module 208, in response to this signal, determines whether the EMA assembly 102 has experienced electric power degradation. For example, if either or both the voltage or current (power) capabilities of the electrical power source 115 have degraded, then the torque capability of the EMA assembly 102, and hence the position and/or rate limits associated with the EMA assembly 102, may also degrade. Preferably, the power monitor module 208 is configured to also implement the limit computation function 300 depicted in FIG. 3 and described above.

The temperature monitor module 212 is also in operable communication with the EMA assembly 102. More specifically, it is preferably coupled to receive one or more temperature signals from the above-noted one or more temperature sensors 118 that are representative of the temperature of the EMA assembly 102. The temperature monitor module 212 is further configured, upon receipt of the one or more temperature signals, to determine what are referred to herein as temperature-based position limit and a temperature-based rate limit of the EMA assembly 102. For example, if the temperature of the EMA assembly 102 increases, and approaches the operational limit for the motor, the motor drive, or various components, the magnitude of the current supplied to the EMA assembly 102 may need to be reduced, which may adversely impact the EMA position and/or rate limits. As with the power monitor module 208, the temperature monitor module 212 is also preferably configured to implement the limit computation function 300 depicted in FIG. 3 and described above The fusion module 206, as was noted above, determines updated position, rate, and bandwidth limits from the design limits and the fault-based limits. Preferably, the fusion module 206 is further configured to determine at least the updated position and rate limits of the EMA assembly additionally from the degradation-based position and rate limits and the temperature-based position limit and rate limits. Thus, as FIG. 2 further depicts, the fusion module 206 is additionally in operable communication with the power monitor module 208 and the temperature monitor module 212. The fusion module 206 may implement various methods and techniques for generating the updated position, rate, and bandwidth limits from the limits it receives from the fault determination module 204, the power monitor module 208, and the temperature monitor module 212. For example, the fusion module 206 may implement a straight-forward logic scheme, in which the minimum limit supplied from each module is selected as the updated limit. Alternatively, the fusion module 206 may implement a fuzzy logic technique to determine the updated limits, or it may implement one or more other statistical-based techniques, which may include assigning various weights to the limits supplied from the fault determination module 204, the power monitor module 208, and the temperature monitor module 212.

No matter the specific technique that the fusion module implements to determine the updated position, rate, and/or bandwidth limits of the EMA assembly 102, the updated limits, as previously noted, are preferably supplied to the controller 120. As was also previously noted, the control law (or laws) implemented in the controller 120 are preferably updated, as needed, to compensate for the updated limits. Hence, the EMA assembly 102 is preferably controlled based on the updated limits. The updated limits may additionally be supplied to one or more other external devices or systems, informing these other devices or systems of the updated limits.

Figure 4:
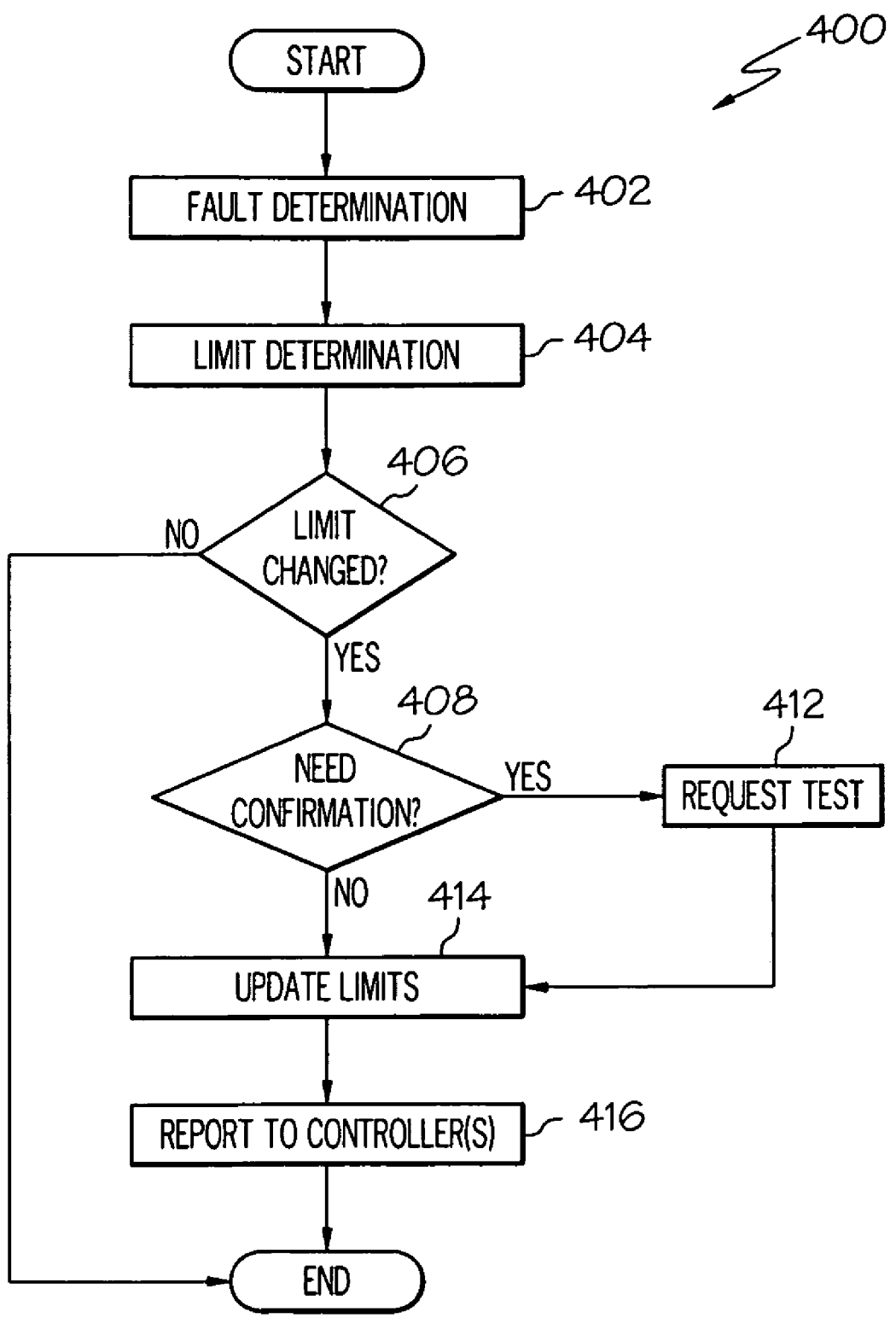
FIG. 4 is a flowchart depicting a process implemented in the effector health management system of FIG. 2.

The above-described functionality of the effector health management system 150 is more clearly illustrated in FIG. 4 in flowchart form. As illustrated therein, the effector health management system 150, in response to the various data it receives, determines whether a fault has occurred 402. As was previously described, the effector health management system 150 may additionally determine the fault probability and severity. In any case, the system 150 thereafter determines appropriate limits (e.g., position, rate, bandwidth, and/or torque limits) 404 and whether one or more limits has changed 406.

If one or more of the limits has changed, the system 150 determines whether the change in the limit(s) should be confirmed 408. If so, then an appropriate test is requested and initiated to so confirm the change 412. If no confirmation is needed, or after the change is confirmed, then the limit(s) is(are) updated 414, and the updated limits are reported 416 to the vehicle controller 160. The updated limits may also be reported, if needed or desired, to the EMA controller 120 and/or another non-illustrated external controller, such as a ground controller.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining updated electromechanical actuator (EMA) limits, comprising the steps of:
   determining, in a health management system, whether the EMA has experienced a fault;
   if the EMA has experienced a fault, determining, in the health management system, and based on the fault, a fault-based position limit and a fault-based rate limit of the EMA;
   supplying a design position limit and a design rate limit of the EMA to the health management system;
   determining, in the health management system, an updated position limit of the EMA based on at least the design position limit and the fault-based position limit; and
   determining, in the health management system, an updated rate limit of the EMA based on at least the design rate limit and the fault-based rate limit.

2. The method of claim 1, further comprising:
supplying the updated position and rate limits of the EMA from the health management system to a controller.

3. The method of claim 1, further comprising:
determining, in the health management system, whether the EMA has experienced electric power degradation;
if the EMA has experienced electric power degradation, determining, in the health management system, a degradation-based position limit and a degradation-based rate limit of the EMA; and
determining, in the health management system, the updated position limit based at least additionally on the degradation-based position limit; and
determining, in the health management system, the updated rate limit of the EMA based at least additionally on the degradation-based rate limit.

4. The method of claim 3, further comprising:
monitoring, using the health management system, an electrical characteristic of an electrical power source that supplies electrical power to the EMA; and
determining, in the health management system, whether the EMA has experienced electric power degradation based on the monitored electrical characteristic.

5. The method of claim 1, further comprising:
monitoring, using the health management system, EMA temperature;
determining, in the health management system, a temperature-based position limit and a temperature-based rate limit of the EMA;
determining, in the health management system, the updated position limit based at least additionally on the temperature-based position limit; and
determining, in the health management system, the updated rate limit of the EMA based at least additionally on the temperature-based rate limit.

6. The method of claim 1, further comprising:
if the EMA has experienced a fault, determining, in the health management system, and based on the fault, a fault-based bandwidth of the EMA;
supplying a design bandwidth of the EMA to the health management system; and
determining, in the health management system, an updated bandwidth of the EMA based at least on the design bandwidth and the fault-based bandwidth.

7. The method of claim 6, further comprising:
supplying the updated position, rate, and bandwidth limits of the EMA from the health management system to a controller.

8. The method of claim 1, further comprising:
upon determining that the EMA has experienced the fault, sending a test signal from the health management system to the EMA; and
monitoring, in the health management system, the EMA response to the test signal; and
based on the EMA response to the test signal, confirming, in the health management system, whether the EMA experienced the fault.

9. The method of claim 8, further comprising:
determining, in the health management system, the fault-based position limit and the fault-based rate limit of the EMA only if it is confirmed that the EMA experienced the fault.

10. A method of controlling an electromechanical actuator (EMA), comprising the steps of:
determining, in a health management system, whether the EMA has experienced a fault;
if the EMA has experienced a fault, determining, in the health management system, and based on the fault, a fault-based position limit and a fault-based rate limit of the EMA;
supplying a design position limit and a design rate limit of the EMA to the health management system;
determining, in the health management system, an updated position limit of the EMA based on at least the design position limit and the fault-based position limit;
determining, in the health management system, an updated rate limit of the EMA based on at least the design rate limit and the fault-based rate limit;
supplying the updated position and rate limits of the EMA from the health management system to a controller; and
controlling the EMA based on the updated position and rate limits.

11. An electromechanical actuator (EMA) health management system, comprising:
memory having stored therein data representative of a design position limit and a design rate limit of the EMA;
a fault determination module in operable communication with the EMA, the fault determination module configured to determine whether the EMA has experienced a fault and, if the EMA has experienced a fault, to determine a fault-based position limit and a fault-based rate limit of the EMA;
a fusion module in operable communication with the memory and the fault determination module to receive therefrom the design position limit and the design rate limit and the fault-based position limit and the fault-based rate limit, respectively, the fusion module configured to determine (i) an updated position limit of the EMA based on at least the design position limit and the fault-based position limit and (ii) an updated rate limit of the EMA based on at least the design position limit and the fault-based rate limit.

12. The system of claim 11, further comprising:
a controller in operable communication with the fusion module to receive therefrom the updated position limit and the updated rate limit of the EMA.

13. The system of claim 11, further comprising:
a power monitor module in operable communication with the EMA, the power monitor module configured to determine whether the EMA has experienced electric power degradation and, if the EMA has experienced electric power degradation, to determine a degradation-based position limit and a degradation-based rate limit of the EMA,
wherein:
the fusion module is further in operable communication with the power monitor module to receive the degradation-based position and rate limits therefrom, and
the fusion module is operable to determine (i) the updated position limit of the EMA based at least additionally on the degradation-based position limit and
(ii) the updated rate limit of the EMA based at least additionally on the degradation-based rate limit.

14. The system of claim 13, wherein:
the EMA is adapted to receive electrical power from an electrical power source; and
the power monitor module is adapted to receive a signal representative of an electrical characteristic of the electrical power source and determines whether the EMA has experienced electric power degradation based on the signal.

15. The system of claim 11, further comprising:

an EMA temperature sensor configured to sense a temperature representative of at least a portion of the EMA and to supply a temperature signal representative thereof;

a temperature monitor module coupled to receive the temperature signal and configured, upon receipt thereof, to determine a temperature-based position limit and a temperature-based rate limit of the EMA, wherein:

- the fusion module is further in operable communication with the temperature monitor module to receive the temperature-based position and rate limits therefrom, and
- the fusion module is operable to determine (i) the updated position limit of the EMA based at least additionally on the temperature-based position limit and (ii) the updated rate limit of the EMA based at least additionally on the temperature-based rate limit.

16. The system of claim 11, wherein:

the memory additionally stores data representative of a design bandwidth of the EMA;

the fault determination module is further configured, if the EMA has experienced a fault, to determine a fault-based bandwidth of the EMA; and the fusion module further receives the fault-based bandwidth and is further configured to determine an updated bandwidth of the EMA based at least on the design bandwidth and the fault-based bandwidth.

17. The system of claim 16, further comprising:

a controller in operable communication with the fusion module to receive therefrom the updated position limit, updated rate limit, and updated bandwidth of the EMA.

18. The system of claim 11, wherein the fault determination module is further configured, upon determining that the EMA has experienced the fault, to:

supply a test signal request to the EMA;

monitor the EMA response to the test signal; and based on the EMA response to the test signal, confirm whether the EMA experienced the fault.

\* \* \* \* \*